United States Patent

Schlieter et al.

[11] Patent Number: 6,021,096
[45] Date of Patent: Feb. 1, 2000

[54] METHOD FOR THE FORMATION OF RADIATED BEAMS IN DIRECTION FINDER SYSTEMS

[75] Inventors: Heiko Schlieter, Altenholz; Holger Eigenbrod, Kronshagen, both of Germany

[73] Assignee: L-3 Communications Elac Nautik GmbH, Kiel, Germany

[21] Appl. No.: 09/117,252

[22] PCT Filed: Nov. 14, 1997

[86] PCT No.: PCT/EP97/06352

§ 371 Date: Jul. 21, 1998

§ 102(e) Date: Jul. 21, 1998

[87] PCT Pub. No.: WO98/23970

PCT Pub. Date: Jun. 4, 1998

[30] Foreign Application Priority Data

Nov. 22, 1996 [DE] Germany .................. 196 48 327

[51] Int. Cl.$^7$ .................. G01S 7/28; G01S 7/52; H01Q 15/02
[52] U.S. Cl. .................. 367/103
[58] Field of Search .................. 367/103, 119, 367/138; 342/195, 152, 149

[56] References Cited

U.S. PATENT DOCUMENTS

| | | | |
|---|---|---|---|
| 5,248,984 | 9/1993 | Sezai | 342/149 |
| 5,268,697 | 12/1993 | Sezai | 342/149 |
| 5,450,089 | 9/1995 | Hui et al. | 342/195 |
| 5,485,162 | 1/1996 | Sezai | 342/378 |
| 5,576,711 | 11/1996 | Morris et al. | 342/152 |

FOREIGN PATENT DOCUMENTS

| | | |
|---|---|---|
| 0 540 249 A1 | 5/1993 | European Pat. Off. . |
| 0 542 440 A1 | 5/1993 | European Pat. Off. . |
| 0 643 439 A1 | 3/1995 | European Pat. Off. . |
| 39 20 705 A1 | 1/1991 | Germany . |
| 42 09 351 C2 | 9/1993 | Germany . |

*Primary Examiner*—Daniel T. Pihulic
*Attorney, Agent, or Firm*—Herbert Dubno

[57] ABSTRACT

For improving the focussing of a direction finding system comprising at least two identical transducers or groups of transducers ($W_L$, $W_R$), on the one hand a magnitude summation signal ($|\Re_L|+|\Re_R|$) and on the other hand a differential signal ($|\Re_L - \Re_R|$) are derived from the transducer output signals ($\Re_L, \Re_R$). Thereafter the magnitude of the differential signal is subtracted from the magnitude summation signal.

16 Claims, 6 Drawing Sheets

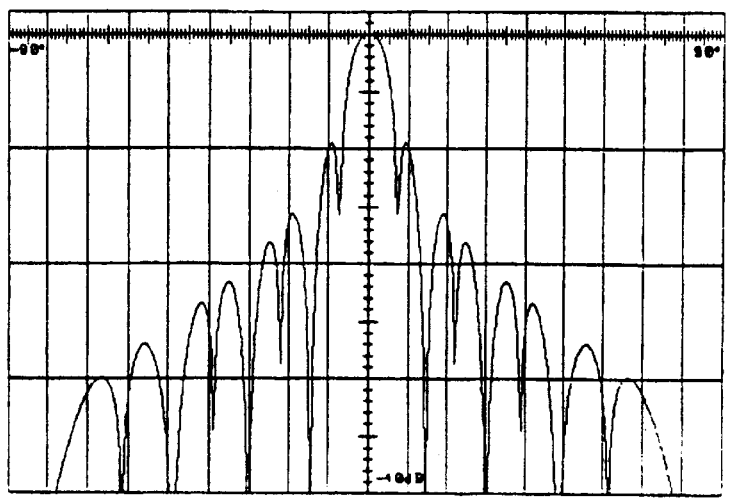
Fig. 3a n = 4
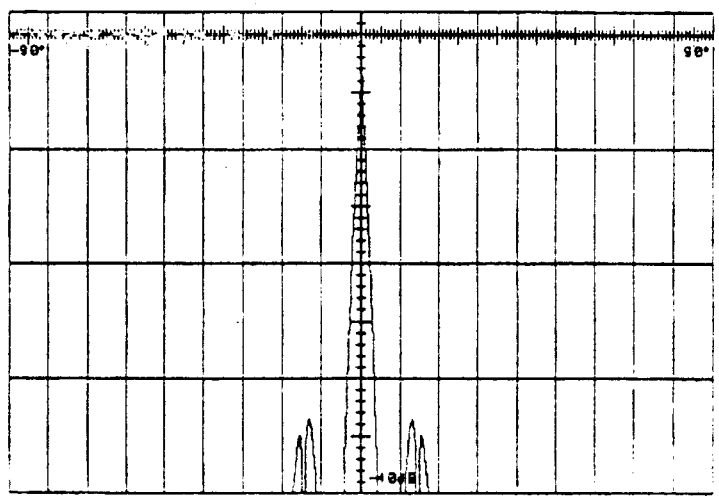
Fig. 3b n = $\frac{1}{2}$
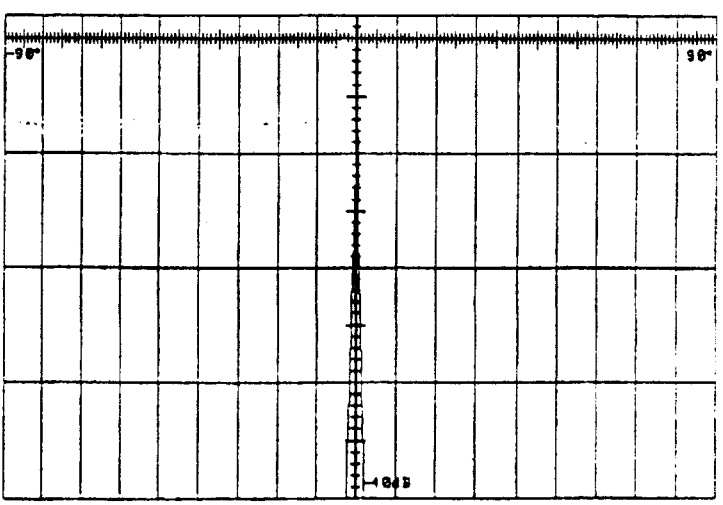
Fig. 3c n = $\frac{1}{3}$

METHOD FOR THE FORMATION OF RADIATED BEAMS IN DIRECTION FINDER SYSTEMS

CROSS REFERENCE TO RELATED APPLICATIONS

This application is a national stage of PCT/EP97/06352 and is based upon German National application 196 48 327.1 filed Nov. 22, 1996 under the International Convention.

FIELD OF THE INVENTION

Our present invention relates to beam forming in direction finding, detection, and survey systems and may be used in connection with acoustic and electromagnetic wave applications, including light waves. It is an object of the invention to achieve improved focussing of the beam and improved side lobe suppression in the directional pattern. In this way the resolution of such systems can be enhanced.

BACKGROUND OF THE INVENTION

With conventional direction finding systems the smallest possible beam width and hence the resolution not only depends on the wavelength and the wave propagation speed in the medium but primarily on the geometric dimensions of the receiving or transmitting array i.e. more the aperture. The shorter the wave length and the larger the antenna dimensions, the better the beam can be focussed. If the antenna consists of several individual transducers, it is not only possible to tilt the main direction of the antenna pattern by phase shifting the control signals or received signals, but also to influence the beam width and the side lobe suppression to a given amount by time delays.

From DE 42 09 352 C2 and from the book "Secondary Radar" by P. Honold, Siemens AG, 19971 p.45 to 48 it is known to achieve a better focussing of the antenne pattern by forming the difference between a summation pattern of two closely adjacent antennas and a corresponding differential pattern.

Furthermore, in the book "Introduction to Monopulse" by D. R. Rhodes, McGraw-Hill Book Company Inc., New York 1959, a method is described, where the summation signal is generated by summing up all transducer signals and subsequently deriving a magnitude or absolute value signal. By subsequently forming the difference between said summation signal and the differential signal the main lobe becomes narrower, but strong first side lobes appear at an angular distance of 10° at both sides of the central main lobe.

SUMMARY OF THE INVENTION

With the invention the directivity of the beam is increased and the side lobes are more effectively suppressed by means of a new signal processing method and without any additional antenna restructuring. The common principle of all embodiments consists of dividing the aperture into two preferably identical transducers or groups of transducers and forming a relation between either the double magnitude of the direction finding signal of one of the two transducers or the sum of the magnitudes of the direction finding signals of both groups of transducers one the one side and a differential signal derived from the two direction finding signals one the other side. This relation can be a ratio of the signals or a difference between the signals. In the simplest case each group of transducers consists of one transducer each. The invention, however, can also be used with transducer rows, planar or curved transducer arrays, circular transducer arrays and the like.

Since the invention as a "summation signal" takes the double magnitude (absolute value) of the output signal of one of the two groups of transducers, or sums up the magnitudes of the output signals of the two groups of transducers, all side lobes, and in particular the otherwise specifically disturbing first side lobes, are located at the same position as the first side lobes of the differential signal, as derived from these magnitudes. Therefore, those side lobe signals cancel out each other when forming a signal quotient (ratio), and when forming a signal difference, respectively. This results in an essential reduction of the side lobes, when compared with the convential method of forming the summation signal.

BRIEF DESCRIPTION OF THE DRAWING

The above and other objects, features, and advantages will become more readily apparent from the following description, reference being made to the accompanying drawing in which:

FIGS. 3a–3c are graphs illustrating calculated directional patterns for different values of a parameter n;

SPECIFIC DESCRIPTION

Figure 1A:
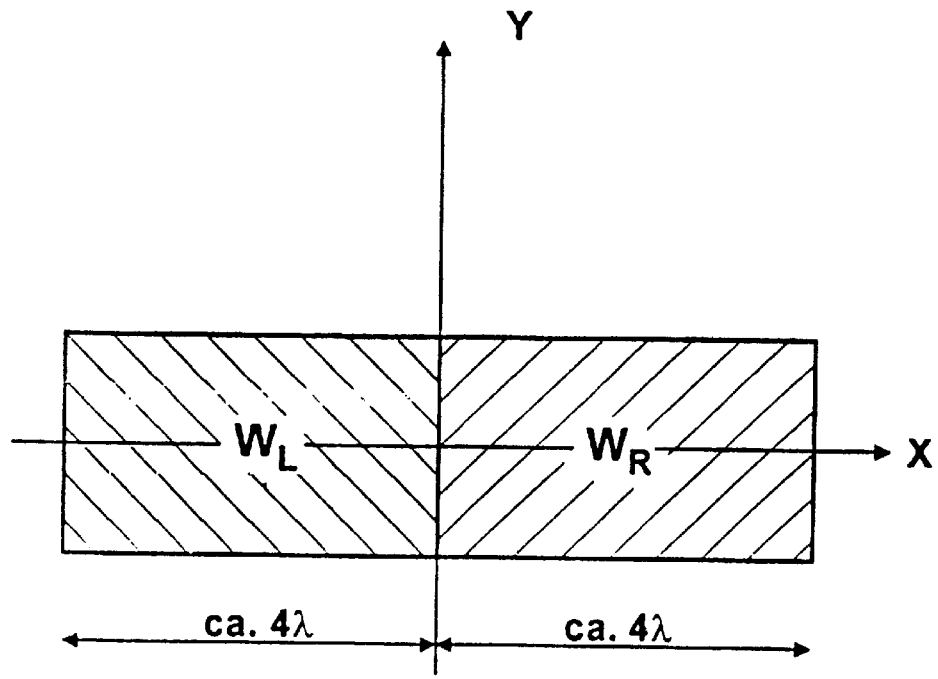
FIG. 1a is a diagrammatic illustration of a transducer array according to the invention.
Figure 1B:
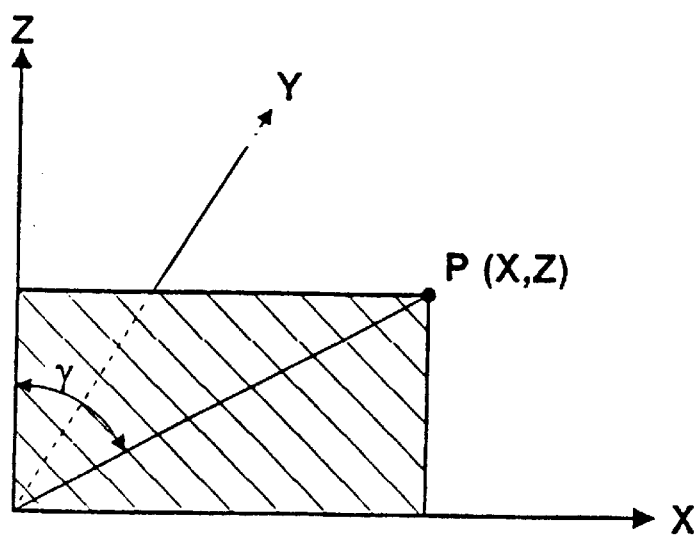
FIG. 1b is a graph of the beam direction.

Now, the invention will be explained with reference to embodiments and patterns as shown in the drawings. FIG. 1a is a top view shows an electro-acoustic transducer consisting of a left half-transducer $W_L$ and a right half-transducer $W_R$, as it is used in underwater acoustic direction finding systems. Each half-transducer can have a width of $4\lambda$ ($\lambda$=wavelength of sound waves in water). It may consist of several individual transducers which are energized or scanned, respectively, either in phase or with phase shifting. The main beam direction z (see FIG. 1b) is orthogonal with respect to the radiating surfaces of the transducers, which are shown as lying in the xy-plane. FIG. 1b shows the coordinate system for representing the points $P(x,y,\gamma)$ in the zx-plane.

Figure 2A:
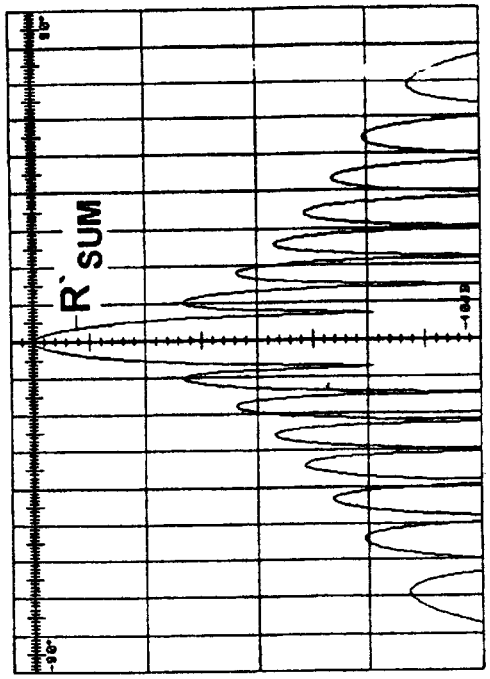
FIG. 2a–2d are various directional patterns illustrating the principles of the invention.

FIG. 2a shows the normalized far field directive pattern of one of the half-transducers $W_L$ or $W_R$ in the zx-plane, i.e. the complex reception signal $\mathfrak{R}_L$ (or $\mathfrak{R}_R$) dependent on the the angle of incidence $\gamma$, however as usual—and as used for the subsequent directive patterns of FIGS. 2 and 3—, in a logarithmic scale and normalized with respect to the greatest value $\mathfrak{R}_{Lmax}$ according to R'hd L=20 log$|\mathfrak{R}_L : \mathfrak{R}_{Lmax}|$, so that the maximum value of the normalized logarithmic quantity $R'_L$ in the main direction of the directive pattern in principle is 0 dB. The far field directive pattern is identical for both half-transducers $W_L$ and $W_R$, so that the directive pattern of FIG. 2a is also valid for the right transducer $W_R$, i.e. $R'_L = R'_R$. The 3 dB beamwidth is 12.6°.

Figure 2B:
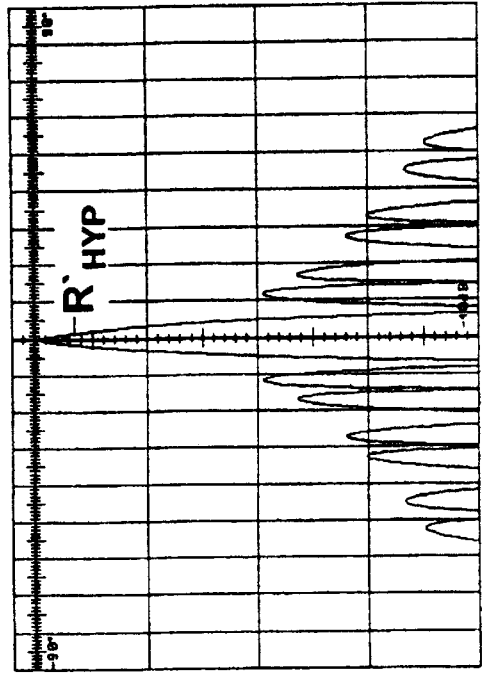

FIG. 2b shows the prior art, namely the formation of a summation directive pattern $R'_{Sum}$ of the entire transducer by phase correct addition of the signals z,1 and z,2 of the two half-transducers $W_L$ and $W_R$, i.e. $\mathfrak{R}_{Sum} = \mathfrak{R}_L + \mathfrak{R}_R$ and $R'_{Sum} =$ 20 log|$\Re_{Sum}$:$\Re_{Sum\ max}$|, respectively. It can be seen that with the well-known summation directive pattern a 3 dB beamwidth of 6.3° and a side lobe suppression of about 13.4 dB can be achieved.

Figure 2C:
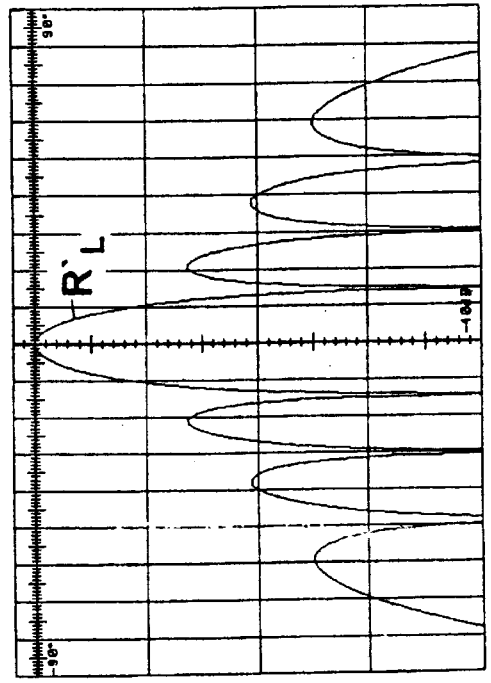

By using the transducer array of FIG. 1a and forming the signal difference $\Re_D = \Re_L - \Re_R$, one obtains the directive pattern $R'_D = 20 \log|\Re_D:2\Re_{L_{max}}|$ as shown in the dotted line of FIG. 2c having a quasi zero-point in forward direction. The non-broken line in FIG. 2c is the directive pattern $R'_L$ or $R'_R$ of one of the two individual transducers $W_L$ or $W_R$, respectively. The differential directivity pattern $R'_D$ in FIG. 2c, for all directions of an incident echo signal, has smaller values than the half-transducer pattern $R'_L$ and $R'_R$, respectively. The side lobes of the differential pattern and the half-transducer pattern, almost without exception, point in the same direction.

This shows that generating the resulting output signal $R_{HYP}$ in accordance with the present invention by either forming a quotient $2 \cdot |\Re_L|:|\Re_D|$ or forming a difference $2 \cdot |\Re_L| - |\Re_D|$ results in essentially improved directivity as well as in an improved side lobe suppression, when compared with the known summation directive pattern of FIG. 2b. The factor 2 in front of $|\Re_L|$ takes into account that the dotted line differential directive pattern of FIG. 2c was normalized to the double maximum value of the half-transducer curve $\Re_L$ or $\Re_R$, respectively.

Because of the identity $|\Re_L| = |\Re_R|$ in the far field, one can use the sum of the magnitudes (absolute values) of the two half-transducer signals $R_{BSum} = |\Re_L| + |\Re_R|$ instead of the double magnitude of the half-transducer signals $\Re_L$ or $\Re_R$, and therewith form the quotient $R_{BSum}:|\Re_D|$ or the difference $R_{BSum} - |\Re_D|$. It must be taken into account that a quotient or difference is formed from the magnitudes of the half-transducer signals and the half-transducer signal difference itself and not from the normalized logarithmic signals as shown in FIGS. 2a and 2c.

Since the output signal $R_{BSum}:|\Re_D|$ or $2 \cdot |\Re_L|:|\Re_D|$ for the main bearing direction, in other words at the zero point of the differential signal $\Re_D$, in the case of forming a quotient would essentially vary in view of the division by interference and noise voltages occuring in practice, an embodiment providing the formation of a difference is preferred in the following:

$$R_{HYP} = 2 \cdot |\Re_L| - |\Re_D| \tag{1}$$

or $$R_{HYP} = R_{BSum} - |\Re_D| = |\Re_L| + |\Re_R| - |\Re_L - \Re_R| \tag{2},$$

respectively.

The above mentioned zero point problem can be solved, if the differential signal $|\Re_D|$ derived from the two half-transducer signals is not allowed to fall below a predetermined minimum level in forward direction at the zero point.

Figure 2D:
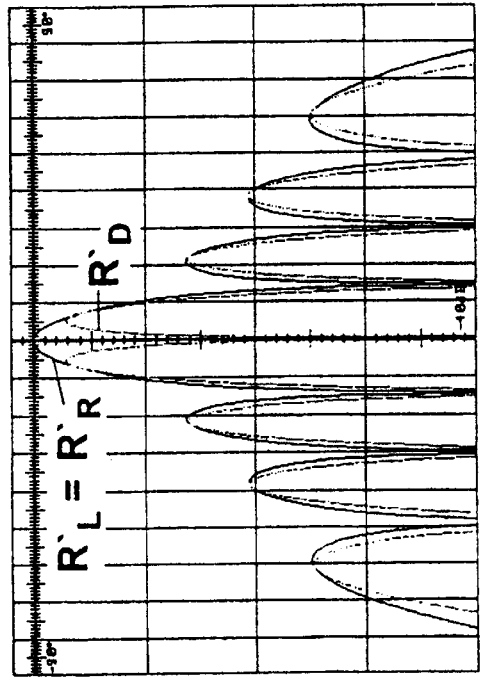

FIG. 2d represents a directivity pattern, thereafter called a Hyper Directivity Pattern $R'_{HYP}$, which is derived by forming the difference between the sum $R_{BSum}$ of the magnitudes of the signals of the two individual transducers on the one hand and the magnitude of the signal difference $\Re_D$ on the other hand. This achieves a 3 dB beamwidth of 2.6°, narrowed down in relation to the summation pattern $R'_{Sum}$ of FIG. 2b from 6.2 by a factor of 2.4. Also the side lobe suppression is further improved. The side lobe suppression of the strongest remaining side lobe is about 20.5 dB and therefore is better by 7 dB when compared with the side lobe suppression of the summation signal.

The creation of the resulting Hyper Directivity Pattern $R'_{HYP}$ according to FIG. 2d is accomplished by complex signal addition and signal subtraction in accordance with the following equations:

$$R'_{HYP(\gamma)} = 20 \log[R_{HYP(\gamma)}:R_{HYP\ max(\gamma)}], \tag{3}$$

whereat $$R_{HYP(\gamma)} = |\Re_L(\gamma)| + |\Re_R(\gamma)| - |\Re_D(\gamma)| \tag{4}$$

with $R_{HYP(\gamma)}$: value of the Hyper Directivity Pattern for angle of incidence $\gamma$, $\Re_L(\gamma)$, $\Re_R(\gamma)$: complex directivity pattern or reception signal value of the left and right individual transducer, respectively, for the angle of incidence $\gamma$, $\Re_D(\gamma) = \Re_L(\gamma) - \Re_R(\gamma)$: complex value of the signal difference as a funktion of $\gamma$.

Since $\Re_L(\gamma)$ and $\Re_R(\gamma)$ are conjugate complexes, it is true that $|\Re_L(\gamma)| = |\Re_R(\gamma)|$ and hence also $$R_{HYP(\gamma)} = 2|\Re_L(\gamma)| - |\Re_D(\gamma)| = 2|\Re_R(\gamma)| - |\Re_D(\gamma)| \tag{5}$$

In principle, the Hyper Directive Pattern can be calculated by means of equation (4) or (5) and results in the same characteristic curve. In practice, for detection purposes, it is preferred to process the reception signals of the two transducers or groups of transducers $W_L$ and $W_R$ in accordance with equation (4), because in this case any possible differences with respect to the acoustic properties of the two individual transducers or groups of transducers together with varying superimposed noise at the two transducers can be compensated more easily and averaged out. The directive pattern of FIG. 2d was generated in accordance with equation (4) and, as mentioned above, results in an improvement of the 3 dB beamwidth by a factor 2.4 and an improvement of the side lobe suppression of the strongest side lobe by 7 dB when compared with the known summation characteristic curve of FIG. 2b. The magnitudes given in equation (4) correspond to the signal amplitudes at the two transducers and are proportional to the acoustic pressure experienced at the transducers. The calculated quantity $R'_{HYP}$ shown in FIG. 2d is the logarithmic signal amplitude as usual.

The directive pattern generated in accordance with the principle as described before, as a further improvement of the invention, can be narrowed further or can be broadened, if the half-transducer signals $\Re_L$ and $\Re_R$ are processed according to the following general equation:

$$R_{HYP}(\gamma, n) = [(|\Re_L| + |\Re_R|)^n - |\Re_L - \Re_R|^n]^{1/n} \text{ with } 0 < n < \infty \text{ and } |\Re_L| = |\Re_R|. \tag{6}$$

Therein $(|\Re_L| + |\Re_R|)^n = (R_{BSum})^n$.

For n=1, equations (4) and (6) are identical, i.e. there is formed a difference of the quantities corresponding to the acoustic pressure. With n=2, as easily can be seen, one obtains the square root of the difference of the squares, i.e. a quantity $R_{HYP}(\gamma,2)$ corresponding to the signal amplitude. It can be proved mathematically that this quantity is identical with the summation signal of FIG. 2b, i.e. $R_{HYP}(\gamma, 2) = bx;1|\Re_{Sum}|$. However, by choosing n<1, e.g. n=½ equation (6) then reads:

$$R_{HYP}(\gamma,½) = [\{|\Re_L| + |\Re_R|\}^{1/2} - \{|\Re_L - \Re_R|\}^{1/2}]^2, \tag{6a}$$

and a still further narrowed Hyper Pattern is obtained with still further reduced side lobes. According to equation (6)

quantity $R_{HYP}(\gamma,n)$ remains a quantity corresponding to the signal amplitude and is not the result of a pur scale extension, as would be the case when squaring the summation pattern $|\Re_{Sum}|$.

FIGS. 3a to 3c show directive patterns calculated according to equation (6) for different values of parameter n, namely n=4, n=½, and n=⅓. Comparing the diagram of FIG. 3a for n=4 with the curve of FIG. 2b for n=2 (summation pattern of the two transducers), a clear broadening of the main lobe to a 3 dB beamwidth of 9.1 can be seen together with an increase of the side lobes. With n increasing, the beamwidth increases also. Choosing n>2, therefore, for most of the applications most probably leads to a disadvantage rather than to an advantage. Inversely, the main beam width is reduced when n is chosen n<1. In this respect, FIG. 3b with n=½ when compared with FIG. 2d with n=1 shows a reduction of the 3 dB beamwidth from 2.6° to only 0.23° und a side lobe suppression of 33.5 dB. Working with n=⅓, the 3 dB beamwidth of the Hyper Directive Pattern of FIG. 3c is only 0.02° and the attenuation of the strongest side lobe is about 46 dB.

Investigations were made to determine whether or not the method according to the invention is more sensitive to manufacturing tolerances of the transducers than the conventional method of generating the sum z,3 $_{Sum}$. It was determined that e.g. randomly distributed transducer tolerances with ±10% phase variation and ±2 dB sensitivity variation for all cases of n=1 and n=½ have only a small effect and do not impair the advantages of the invention. These tolerance calculations were performed for a transducer arrangement as shown in FIG. 1a with two identical groups of transducers, each consisting of 8 transducers connected in parallel. The invention, however, is also advantageously applicable in transducer arrays, and in particular when the main beam is tilted by means of phase control or propagation time control as well as when using so-called shading functions. A prerequisite is the division of the array into two central symmetric groups of transducers, whose directive patterns do not differ too much in practice. Also with spatial transducer arrays, in particular circular arrays, the invention can be used profitably.

When forming the summation signal $R_{BSum}$, it was assumed that the signals $\Re_L$ and $\Re_R$ from both individual transducers are used for the summation with identical weight. If the magnitude signals are identical, i.e. $|\Re_L|=|\Re_R|$, the summation signal may be calculated in accordance with the more general relation:

$$R_{BSum} = a \cdot |\Re_L| + b \cdot |\Re_R| \text{ with } a+b=2 \qquad (7).$$

Figure 4:
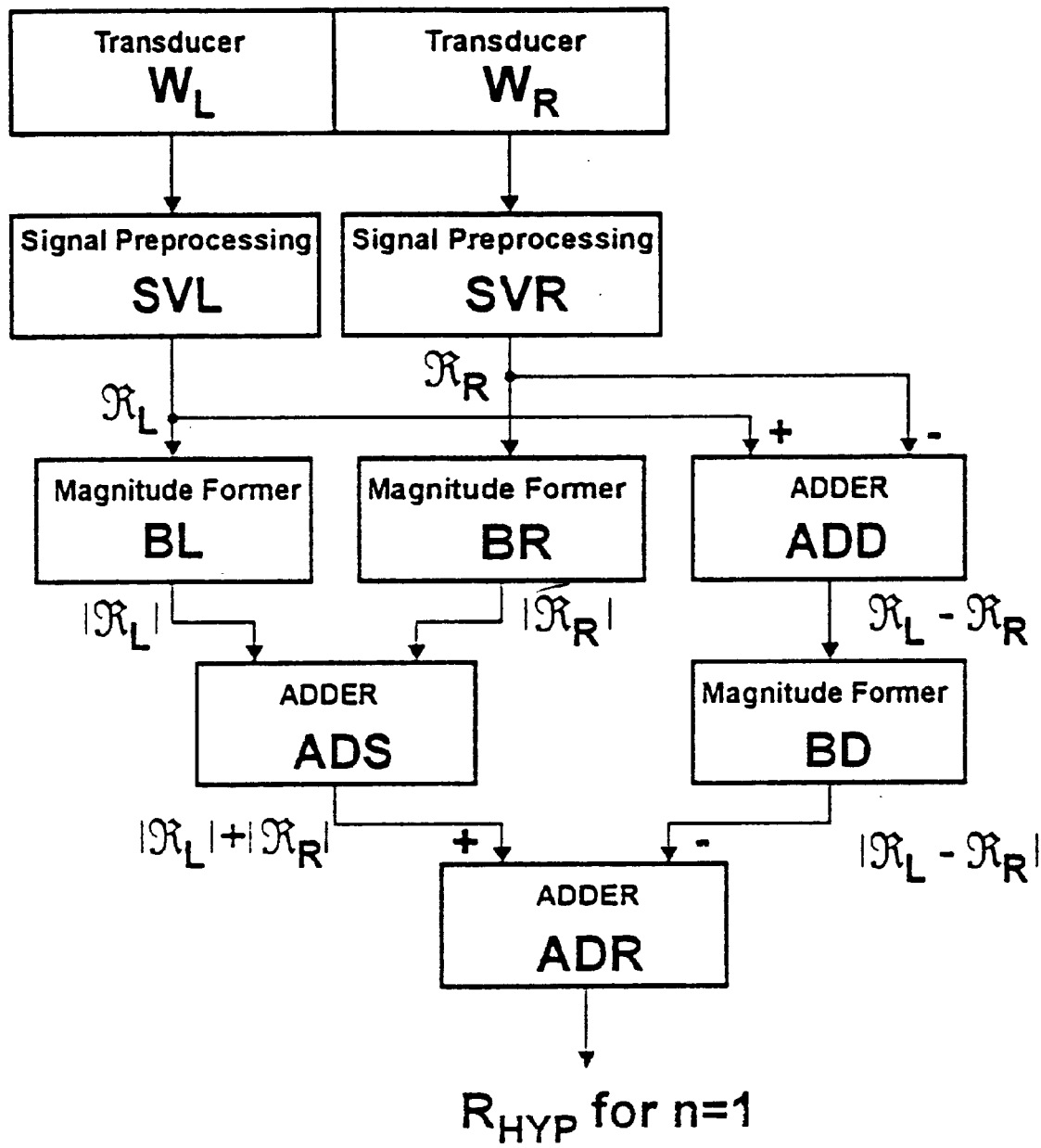
FIG. 4 is a block diagram illustrating one embodiment of the invention.

A block diagram of a circuit and calculation arrangement for signal processing according to equation (4), (or equation (6) with n=1), is shown in FIG. 4. The left and the right individual transducers $W_L$ and $W_R$ may consist of a plurality of transducer elements which internally are connected in parallel. Left and right absolute value forming circuits BL and BR on the one hand and a difference forming adder ADD on the other hand are connected to the left and right transducers $W_L$ and $W_R$ via left and right signal pre-processing circuits SVL and SVR, respectively. Therewith, signals $|\Re_L|$ and $|\Re_R|$ as well as $\Re_L - \Re_R$ are available. The two first mentioned signals are fed to a sum forming adder ADS and the last mentioned differential signal is supplied to a magnitude signal forming circuit BD. In this way, one obtains a magnitude sum $R_{BSum} = |\Re_L| + |\Re_R|$ of the two half-transducer signals as well as the magnitude $|\Re_D| = |\Re_L - \Re_R|$ of the differential signal. These two magnitude signals are supplied to the difference forming adder ADR, which provides the resultung output signal $R_{HYP}$ for n=1. The conventional summation pattern would be obtained when in the right adder ADD a sum $\Re_L + \Re_R$ would be formed instead of the difference $\Re_L - \Re_R$ and from this sum a magnitude signal would be derived subsequently.

Figure 5:
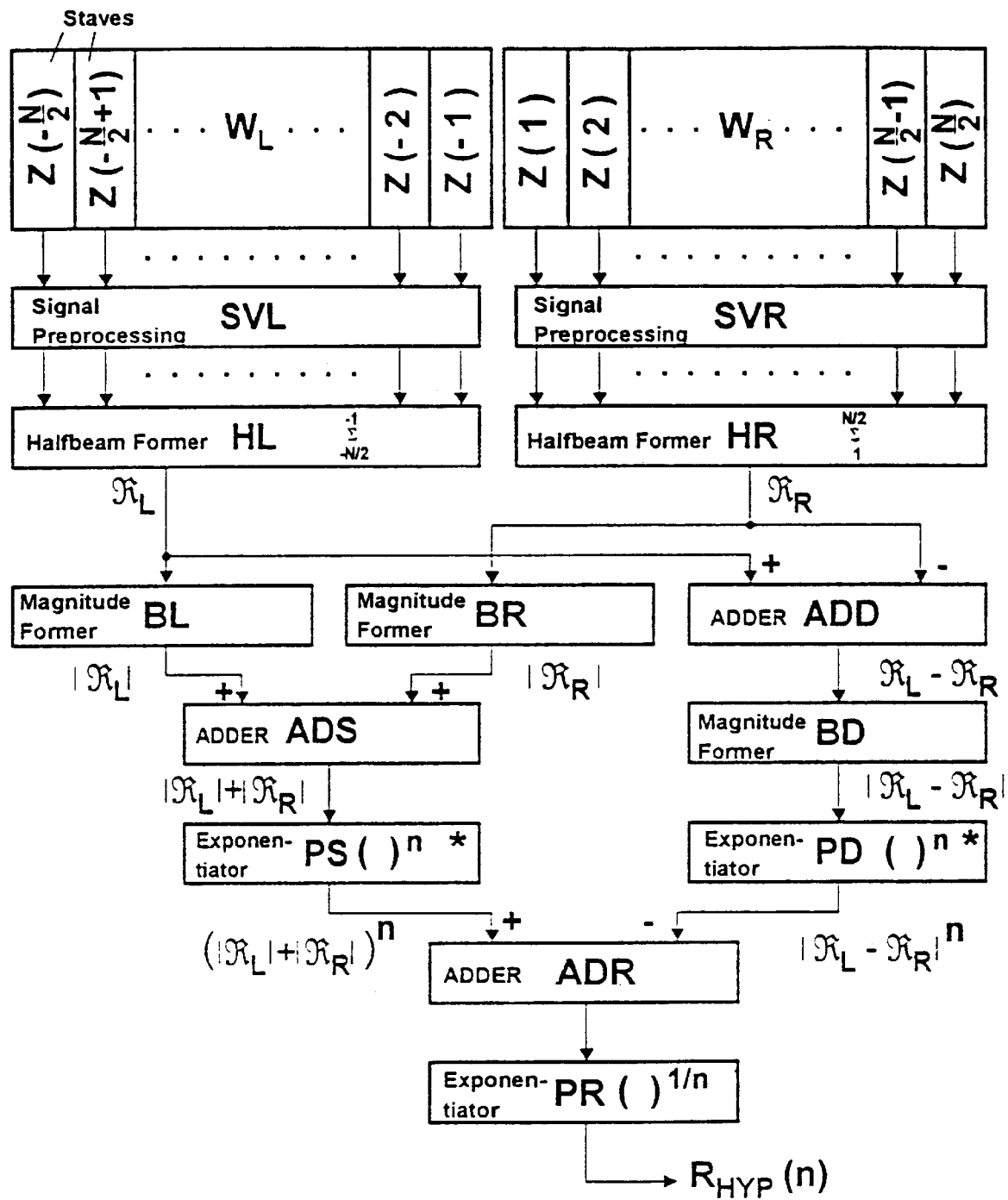
FIG. 5 is a block diagram of another embodiment of the invention.

FIG. 5 depicts, in the form of a block diagram, the signal processing in accordance with equation (6), whereby the two transducer halves are made up of an identical number of groups of transducer elements or transducer rows Z (staves), the output signals of which are fed to the left and right half-beam former HL and HR, respectively, after suitable signal pre-processing (amplification, filtering, if needed A/D conversion, etc.) by pre-processing devices SVL and SVR. Output signals $\Re_L$ and $\Re_R$ of those half-beam formers are fed in FIG. 4 on the one hand to magnitude forming circuits BL and BR and on the other hand to difference forming adder ADD. A summing adder ADS is connected to the outputs of magnitude forming circuits BL and BR. A magnitude forming circuit BD for the differential signal is connected to the output of difference forming adder ADD. An exponentiator PS for the magnitude summation signal $(|\Re_L|+|\Re_R|)^n$ is provided between the output of adder ADS and the difference forming adder ADR. A further exponentiator PD for the magnitude of differential signal $|\Re_L - \Re_R|^n$ is inserted between the output of magnitude forming circuit BD and said adder ADR. A further exponentiator PR is connected to the output of adder ADR and in accordance with equation (6) forms the 1/n-th power of the difference between the adder ADR input signals, i.e. provides an n-th root evolution, and therewith makes available the resulting output signal $R_{HYP}(n)$ of the the Hyper Beam Pattern.

With the described half-beam former circuits HL and HR, the main beam direction may be tilted in a well known manner or can be adjusted to a direction which deviates from the forward direction. If one would sum up the signals $\Re_L$ and $\Re_R$ as provided by half-beam former circuits HL,HR, and thereafter derive the magnitude of the sum, also in this case the known summation pattern $|\Re_{Sum}|$ would be obtained. This means that the signal processing requirement up to this magnitude formation is the same as with a conventional summation directive pattern system. The additional requirement caused by the invention is limited to two magnitude forming functions and two adder functions for two values, and only in the case of n≠1 requires three power forming operations. If n=1, power forming circuits or exponentiators PS for the summation signal, PD for the differential signal, and PR for the outputsignal of adder ADR in FIG. 5 are not required. All signal processing is preferably performed digitally in a suitably programmed microcomputer.

Figure 6:
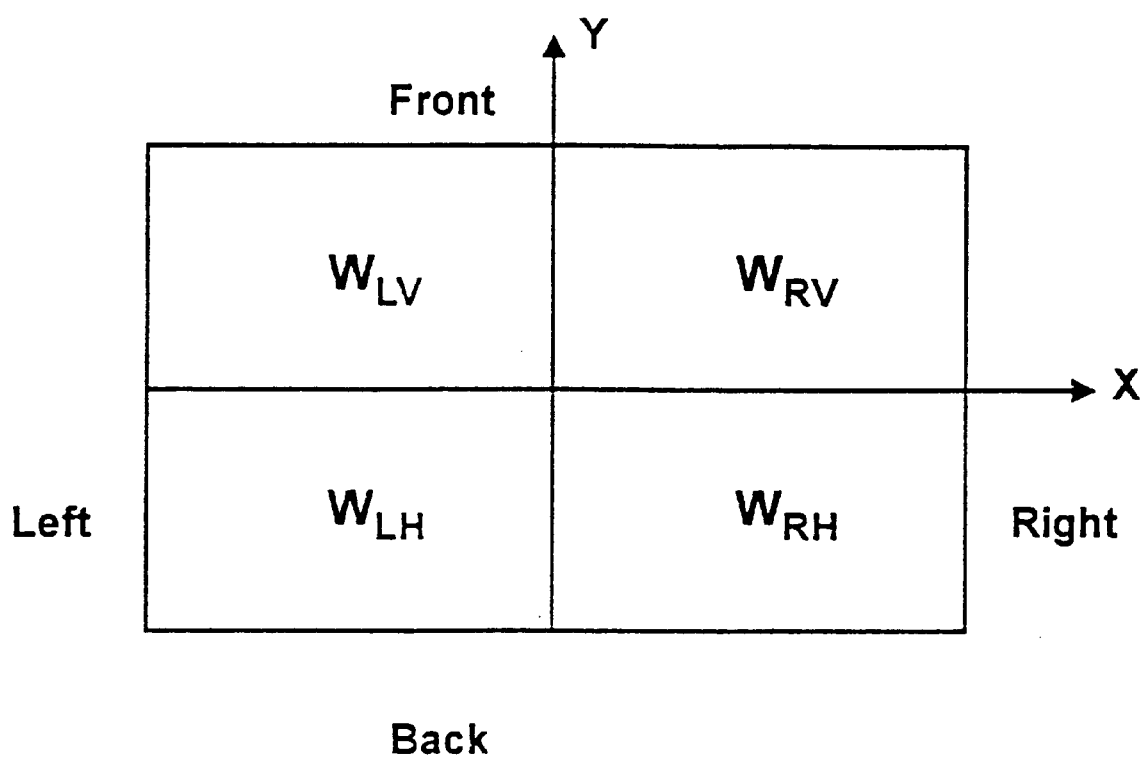
FIG. 6 is a diagrammatic illustration of another transducer array in accordance with the invention.

If the directive beam is to be improved within two orthogonal planes by means of the invention, i.e. is to be focussed more sharply, then the transducer array is divided into four quadrants as shown in FIG. 6in order to provide Hyper beam forming in the xz-plane as well as in the yz-plane. For Hyper beam forming in the xz-plane the two left and right quadrants $W_{LH}$, $W_{LV}$ and $W_{RH}$, $W_{RV}$, respectively, are combined, and for the yz-plane the two front and back quadrants $W_{LV}$, $W_{RV}$ and $W_{LH}$, $W_{RH}$, respectively, are combined. The equations for forming the resulting directive beam then are:

$$R_L = R_{LH} + R_{LV} \qquad (8)$$
$$R_R = R_{RH} + R_{RV}$$

-continued $$R_H = R_{LH} + R_{RH}$$

$$R_V = R_{LV} + R_{RV}$$

For the directive pattern in the xz-plane, according to equation (6), follows:

$$R_{HYP}xz(\gamma, n) = [(|R_L| + |R_R|)^n - |R_L - R_R|^n]^{1/n} \quad (9a)$$

and for the yz-plane $$R_{HYP}yz(\gamma, m) = [(|R_H| + |R_V|)^m - |R_H - R_V|^m]^{1/m} \quad (9b)$$

For generating a directive beam which is more sharply focussed in both planes, the results of these two equations are combined in a suitable manner, e.g. are multiplied and/or an avaraging operation is performed. The different powers n and m allow a different degree of focussing of the resulting beam in the two orthogonal planes.

The reception signal processing of an echo sounding or sonar system, by way of example, shows that the invention may also be successfully used in direction finding systems operating with other kinds of waves, e.g. electro-magnetic waves including light waves, if the hardware is provided properly. The transducers then are formed by antennas or elementary antennas, e.g. dipole antennas or optical sensors. Furthermore, the invention is not limited to the processing of reception signals but in principle can also be used for generating focussed transmitter beams.

We claim:

1. A method for beam forming in direction finding systems with two identical groups ($W_L$, $W_R$) of transducers, each group comprising at least one transducer, where in an electronic signal processing device
   a) a complex differential signal $\mathfrak{R}_D = \mathfrak{R}_L - \mathfrak{R}_R$ is derived from the complex output signals $\mathfrak{R}_L - \mathfrak{R}_R$ of the two groups of transducers;
   b) a magnitude summation signal $R_{BSum}$ is formed from the absolute values of said transducer group output signals according to equation (7)

$R_{BSum} = a \cdot |\mathfrak{R}_L| + b \cdot |\mathfrak{R}_R|$, with $a+b=2$;

and
   c) for generating a resulting output signal ($R_{HYP}$), said magnitude summation signal $R_{BSum}$ is divided by the magnitude ($|\mathfrak{R}_D|$) of said complex differential signal ($\mathfrak{R}_D$).

2. The method of claim 1, characterized by selecting a=b=1.

3. The method of claim 1, characterized by selecting a=0 or b=0.

4. A method for beam forming in direction finding systems with two identical groups ($W_L$, $W_R$) of transducers, each group comprising at least one transducer, wherein an electronic signal processing device
   a) a complex differential signal ($\mathfrak{R}_D = \mathfrak{R}_L - \mathfrak{R}_R$) is derived from the complex output signals ($\mathfrak{R}_L$, $\mathfrak{R}_R$) of the two groups of transducers;
   b) a magnitude summation signal $R_{BSum}$ is formed from the absolute values of said transducer group output signals according to equation (7)

$R_{BSum} = a \cdot |\mathfrak{R}_L| + b \cdot |\mathfrak{R}_R|$, with $a+b=2$;

and
   c) a resulting output signal ($R_{HYP}$) is derived in accordance with equation (6)

$R_{HYP} = [(R_{BSum})^n - |\mathfrak{R}_D|^n]^{1/n}$, with $0 < n < \infty$.

5. The method of claim 4, characterized by selecting n=1, so that for generating and resulting output signal ($R_{HYP}$) the magnitude ($|\mathfrak{R}_D|$) of said complex differential signal ($\mathfrak{R}_D$) is subtracted from said magnitude summation signal ($R_{Bsum}$).

6. The method of claim 4, characterized by selecting n=½.

7. The method of claim 4, characterized by selecting n=⅓.

8. The method of claim 4, characterized by selecting $|\mathfrak{R}_L| = |\mathfrak{R}_R|$.

9. The method of claim 4, characterized by selecting a=b=1.

10. The method of claim 4, characterized by selecting a=0 or b=0.

11. A device for carrying out the method of claim 4, comprising the following features:
    a) a circuit (SVL, SVR) for signal pre-processing is connected to the output of each group of transducers ($W_L$, $W_R$);
    b) a first and a second magnitude forming means (BL, BR), respectively, is connected to the output of each signal pre-processing circuit;
    c) the outputs of the two signal pre-processing circuits (SVL, SVR) are further connected to the inputs of a first difference forming adder (ADD), which subtracts the pre-processed output signal of one of the groups of transducers from the corresponding signal of the other group of transducers;
    d) a third magnitude forming means (B) is connected to an output of said first difference forming adder (ADD);
    e) a summing adder (AD) is connected to the outputs of said first and second magnitude forming means (BL, BR); and
    f) a second difference forming adder (AD), providing said resulting output signal ($R_{HYP}$), is connected to the outputs of said summing adder (AD) and said third magnitude forming means (B).

12. The device of claim 11, comprising the following features:
    a) a first exponentiator (PS is connected between an output of said summing adder (AD) and a first input (+) of said second difference forming adder (AD);
    b) a second exponentiator (PD) is connected between said third magnitude forming means (B) and a second input of said second difference forming adder (AD); and
    c) a third exponentiator (PR) providing said resulting output signal ($R_{HYP}$) is connected to the output of said second difference forming adder (AD).

13. The device of claim 11 for processing the output signals of two groups of transducers, with each group comprising a plurality of transducer elements, wherein for each group of transducers a signal processing channel is provided and includes a directive beam former (HL, HR), such that a first directive beam former (HL) is connected between the signal pre-processing circuit (SVL) of the first channel and said first magnitude forming means (BL), and a second directive beam former (HR) is connected between the signal pre-processing circuit (SVR) of the second channel and said third magnitude forming means (BR).

14. The device of claim 13, wherein the inputs of said first difference forming adder (ADD) are also connected to the outputs of said directive beam formers (HL, HR).

15. A device for beam forming in direction finding systems with two identical groups ($W_L$, $W_R$) of transducers, each group comprising at least one transducer, where a summation signal ($R_{BSum}$) and a differential signal ($\Re_D = \Re_L - \Re_R$) are derived from complex output signals (z,1 , $\Re_R$) of the two groups of transducers, the summation signal ($R_{BSum}$) is formed by summing magnitudes ($|\Re_L|$, $|\Re_R|$) of said complex transducer group output signals in the form of a magnitude summation signal ($R_{BSum} = |\Re_L| + |\Re_R|$), and for generating a resulting output signal ($R_{HYP}$) the magnitude ($|\Re_D|$) of the differential signal is subtracted from said magnitude summation signal ($R_{BSum}$) said device comprising:

a) a circuit (SVL, SVR) for signal pre-processing connected to an output of each group of transducers ($W_L$, $W_R$);

b) a first and a second magnitude forming means (BL, BR), respectively, is connected to an output of each signal pre-processing circuit;

c) the outputs of the two signal pre-processing circuits (SVL, SVR) are further connected to the inputs of a first difference forming adder (ADD), which subtracts the pre-processed output signal of one of the groups of transducers from the corresponding signal of the other group of transducers;

d) a third magnitude forming means (BD) is connected to an output of said first difference forming adder (ADD);

e) a summing adder (ADS) is connected to the outputs of said first and second magnitude forming means (BL, BR);

f) a second difference forming adder (ADR), providing said resulting output signal ($R_{HYP}$), is connected to the outputs of said summing adder (ADS) and said third magnitude forming means (BD);

g) one exponentiator each (PS, PD) is connected between the output of said summing adder (ADS) and said third magnitude forming means (BD) on the one hand and the inputs of said second difference forming adder (ADR) on the other hand; and h) a third exponentiator (PR) providing said resulting output signal ($R_{HYP}$) is connected to the output of said second difference forming adder (ADR).

16. A device for beam forming in direction finding systems with two identical groups ($W_L$, $W_R$) of transducers, each group comprising at least one transducer, where a summation signal ($R_{BSum}$), and a differential signal ($\Re_D = -\Re_R$) are derived from complex output signals ($\Re_L$, $\Re_R$) of the two groups of transducers, the summation signal ($R_{BSum}$) is formed by summing magnitudes ($|\Re_L|$, $|\Re_R|$) of said complex transducer group output signals in the form of a magnitude summation signal ($R_{BSum} = |\Re_L| + |\Re_R|$), and for generating a resulting output signal ($R_{HYP}$) the magnitude ($|\Re_D|$) of the differential signal is subtracted from said magnitude summation signal ($R_{BSum}$), said device comprising:

a) a circuit (SVL, SVR) for signal pre-processing connected to an output of each group of transducers ($W_L$, $W_R$);

b) a first and a second magnitude forming means (BL, BR), respectively, is connected to an output of each signal pre-processing circuit;

c) the outputs of the two signal pre-processing circuits (SVL, SVR) are further connected to the inputs of a first difference forming adder (ADD), which subtracts the pre-processed output signal of one of the groups of transducers from the corresponding signal of the other group of transducers;

d) a third magnitude forming means (BD) is connected to an output of said first difference forming adder (ADD);

e) a summing adder (ADS) is connected to the outputs of said first and second magnitude forming means (BL, BR);

f) a second difference forming adder (ADR), providing said resulting output signal ($R_{HYP}$), is connected to the outputs of said summing adder (ADS) and said third magnitude forming means (BD);

g) a directive beam former (HL, HR) for each of the groups of transducers is connected between said signal pre-processing circuits and said first and second magnitude forming means (BL, BR); and h) inputs of said first difference forming adder (ADD) are also connected to the outputs of said directive beam formers (HL, HR).

* * * * *